(12) United States Patent
Gross et al.

(10) Patent No.: US 8,875,224 B2
(45) Date of Patent: *Oct. 28, 2014

(54) ACCESS CONTROL IN DATA PROCESSING SYSTEM

(75) Inventors: Thomas R. Gross, Rueschlikon (CH); Guenter Karjoth, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 13/460,842

(22) Filed: May 1, 2012

(65) Prior Publication Data

US 2012/0216247 A1    Aug. 23, 2012

Related U.S. Application Data

(63) Continuation of application No. 13/077,881, filed on Mar. 31, 2011, now Pat. No. 8,566,906.

(30) Foreign Application Priority Data

Mar. 31, 2010   (EP) .................................... 10158633

(51) Int. Cl.
*G06F 9/00*      (2006.01)
*G06F 21/00*     (2013.01)

(52) U.S. Cl.
CPC ..................................... *G06F 21/00* (2013.01)
USPC ................................................ 726/1; 726/2

(58) Field of Classification Search
CPC ....... H04L 63/10; H04L 63/101; H04L 63/20; G06F 21/62; G06F 21/6209; G06F 21/604; G06F 2221/2141

USPC ......................................................... 726/1, 2
See application file for complete search history.

(56) References Cited

U.S. PATENT DOCUMENTS

| 6,988,280 B2 | 1/2006 | Burnett |
| 7,096,367 B2 | 8/2006 | Garg et al. |

(Continued)

OTHER PUBLICATIONS

B.J. Garback et al., "XACML for RBAC and CaDABRA: Constrained Delegation and Attribute-based Role Assignment" Computer Science Department, University of Virginia, Charlottesville, VA, http://www.cs.virginia.edu/, year 2005.

(Continued)

*Primary Examiner* — Matthew Smithers
(74) *Attorney, Agent, or Firm* — Feb Cabrasawan

(57) ABSTRACT

A policy data structure defines predetermined authorizations, each relating to authorization of at least one user to access at least one resource as well as to dynamic access requests. Each dynamic access request indicates a condition to be satisfied by a respective set of attributes associated with a user request to access a resource and for the request to be granted in absence of an authorization determinative of the request. If the structure does not define an authorization for a request to access a resource, it is determined whether the structure defines a dynamic access requirement determinative for the request, and if so, whether to grant the request in accordance with the respective set of attributes associated with the request. For at least one request, after determining whether to grant the request, a dynamic authorization relating to authorization to access the resource within the request is added to the structure.

10 Claims, 3 Drawing Sheets

(56) References Cited

U.S. PATENT DOCUMENTS

| | | | |
|---|---|---|---|
| 7,523,206 B1 | 4/2009 | Naish | |
| 8,566,906 B2 * | 10/2013 | Gross et al. ........................ | 726/2 |
| 2005/0004913 A1 | 1/2005 | Gross et al. | |
| 2005/0086228 A1 | 4/2005 | Gross et al. | |
| 2006/0236369 A1 | 10/2006 | Covington et al. | |
| 2008/0184353 A1 | 7/2008 | Carroll | |
| 2010/0024009 A1 | 1/2010 | Comay | |
| 2010/0095367 A1 | 4/2010 | Narayanaswamy | |
| 2010/0325686 A1 | 12/2010 | Davis | |

OTHER PUBLICATIONS

G. Karjoth, "Access control with IBM Tivoli Access Manager," ACM Transactions on Information and System Security, May 2003.

R. Laborde et al., "Dealing with stable environmental conditions in XACML systems," 2nd Int'l Conf. on Systems & Networks Communications, year 2007.

R.S. Sandhu et al., "Access control: Principles and practice," IEEE Communications Magazines, Sep. 1994.

* cited by examiner

ACCESS CONTROL IN DATA PROCESSING SYSTEM

RELATED APPLICATIONS

The present patent application claims priority under 35 USC 119 to the previously filed and presently pending patent application of the same title filed in the European Patent Office on Mar. 31, 2010, and assigned application number 10158633.7.

BACKGROUND

Access control is fundamental for enforcing security and privacy requirements in data processing systems, protecting system resources such as files, applications, databases, and so on, against unauthorized access by internal or external system users. In electronic commerce, for example, and indeed in the Internet in general, one of the most important considerations is ensuring that only authorized users can access valuable resources.

SUMMARY

A method of an embodiment of the invention includes determining, by a processor, whether a policy data structure defines an authorization for a request to access a resource. The policy data structure defining predetermined authorizations. Each predetermined authorization relates to authorization of at least one user to access at least one resource. Each predetermined authorization further relates to dynamic access requests. Each dynamic access request indicates a condition to be satisfied by a respective set of attributes associated with a user request to access a resource and for the request to be granted in absence of an authorization determinative of the request. The method includes, in response to determining that the policy data structure defines an authorization for the request to access the resource, applying the authorization, by the processor, to determine whether to grant the request.

The method includes, in response to determining that the policy data structure does not define an authorization for the request to access the resource, determining, by the processor, whether the policy data structure defines a dynamic access requirement determinative for the request. The method includes, in response to determining that the policy data structure defines a dynamic access requirement determinative for the request, determining, by the processor, whether to grant the request in accordance with the respective set of attributes associated with the request. The method includes, for at least one user request, after determining whether to grant the request, adding a dynamic authorization relating to authorization to access the resource within the request, by the processor, to the policy data structure.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
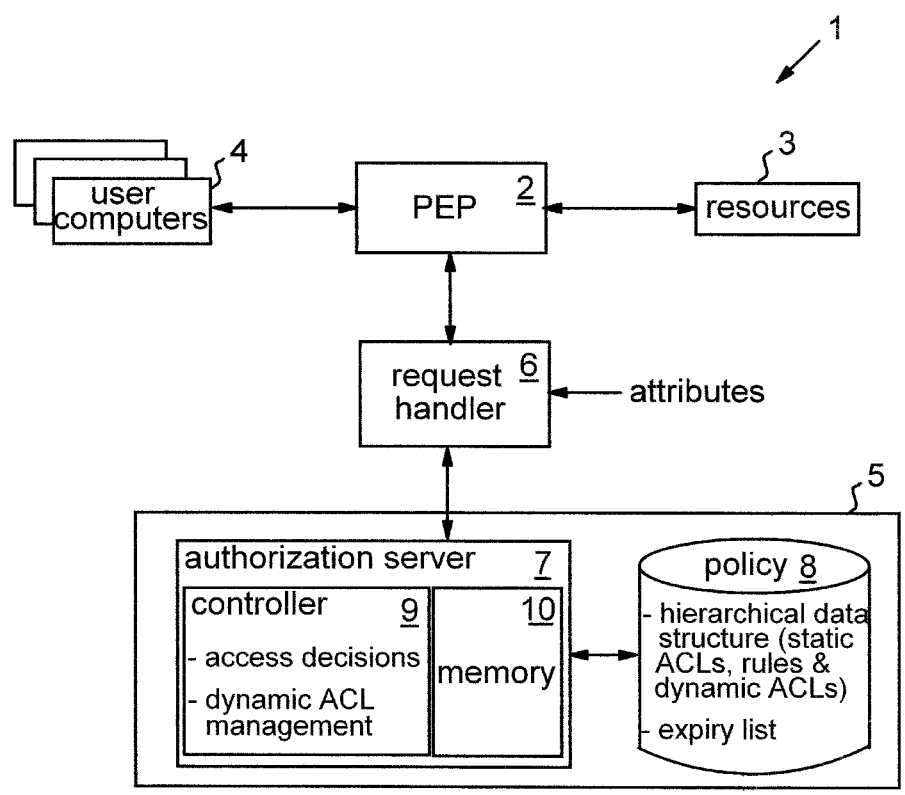
FIG. 1 is a diagram of a schematic representation of a data processing system implementing an access control method, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, access control is fundamental for enforcing security and privacy requirements in data processing systems. In simple terms, access control involves defining an access control policy which indicates the extent to which users are authorized to access controlled resources, and then applying this policy to decide whether to grant or deny user requests to access resources. The access control policy is defined by some form of data structure, which may have a number of component data structures, stored in system memory. Individual access rights are represented in the policy data structure by some form of "authorization", where a given authorization relates to authorization of at least one user to access at least one resource and may in general indicate that the user is, or on the contrary is not, authorized to access the resource(s) in question.

In general, the user may be any requesting entity such as a person or group of persons, or an application, device, subsystem, and so on, having an identity in the data processing system. A resource may be any system component, item or functionality, such as a service, device, object, URL (universal resource locator), data entity, and so on, to which access needs to be controlled. Also, authorizations might be defined explicitly or implicitly in a policy data structure, and may be subject to particular constraints, such as in relation to the nature of permitted access (e.g., the allowed action) or the time of day at which access can occur. Any such constraints may themselves be defined explicitly or implicitly in the policy data structure.

In general, the particular way in which policy is represented in policy data structures, and how these structures are interpreted by access control decision logic, can vary widely in access control systems. However, a predefined policy data structure based on authorizations that define user access privileges lies at the heart of all traditional access control systems. Such policy data structures can be considered "static" in the sense that they define predetermined authorizations that are input in advance by a system administrator, this structure then being applied to all user requests in operation until the policy is subsequently updated by administrator intervention. These static policy data structures can be designed for highly efficient operation. Traditional ACL (access control list)-based access control systems provide a particular example here. In these systems, authorizations are defined (inter alia) by ACLs. These ACLs are set statically by system administrators and are very efficient to evaluate.

It has also been proposed to use basic caching techniques to further enhance efficiency of traditional access control systems. In particular, the result of an authorization request can be stored in a cache memory. This result can then be re-used if the same request is received again, avoiding re-evaluation of the policy data structure. The cached results are flushed in the event of a policy change.

While the foregoing systems involve comparing essentially static properties indicated in a user request (e.g., user identity) against predetermined authorizations defined in the policy, modern applications are increasingly demanding access control based upon dynamic attributes retrieved in the very moment of the access control decision. In general, such attributes can be any items of useful information associated in some way with the request, and may be obtained from a variety of attribute sources as well as the requesting user. These attributes may relate, for instance, to the user, the resource, the requested action or the environment in which the request is made (e.g., current time, user location, etc). Access control based on such dynamically retrieved attributes can be realized by evaluating predefined requirements indicating conditions which must be satisfied by attributes associated with a user request for the request to be granted. These conditions can be defined, for instance, by Boolean rules. Modern identity management systems similarly base their access control decisions on dynamically obtained attributes encoded in certified claims or attribute credentials.

Access control based upon dynamic attributes provides a vast spectrum of new functionality. This method is powerful, yet costly. For example, it can take several Round Trip Times (RTTs) to retrieve the set of dynamic attributes that need to be evaluated to reach a decision on a request. In addition, the engines for dynamic rule evaluation are significantly slower than the static policy evaluation process in traditional systems. This loss of efficiency is a drawback of the use of dynamic attributes in access control.

At least some embodiments of the invention overcome these disadvantages. In one embodiment, access to resources is controlled in accordance with an access control policy data structure. The policy data structure defines predetermined authorizations and dynamic access requirements. Each of the former relates to authorization of at least one user to access at least one resource, whereas each of the latter relates to a condition to be satisfied by a respective set of attributes associated with a user request to access a resource for the request to be granted in absence of a said authorization determinative for that request.

If there is not a defined authorization for a request, then a dynamic access requirement may instead have been defined for the request. As such, deciding whether to grant the request is controlled in this case accordance with a respective set of attributes associated with the request. For at least some user requests, upon deciding whether to grant the request by applying a dynamic access requirement, a dynamic authorization relating to authorization of the user to access the requested resource is added to the data structure in question.

Access control methods can thus be based around a policy data structure defining both predetermined authorizations and dynamic access requirements. The latter permit evaluation of requests based on dynamically obtained attributes. If the policy data structure contains a predefined authorization that is determinative for a request (i.e., is decisive as to whether the request should be granted or refused), then this will be applied to decide whether to grant the request. Hence, the system checks first whether the policy data structure defines an authorization that is determinative for a request, and, if so, applies it.

However, in the absence of a determinative authorization, the system checks whether the policy data structure defines a dynamic access requirement that can be used to obtain a decision for the request. If the policy does contain a determinative dynamic access requirement, a grant/refusal decision is made in accordance with the appropriate set of attributes associated with the request—i.e., according to whether the condition indicated by the dynamic access requirement is satisfied by this attribute set. For at least some requests decided on the basis of a dynamic access requirement, an authorization is then added to the policy data structure relating to authorization of the requesting user to access the requested resource. Such an authorization is a "dynamic authorization," since it is defined dynamically in contrast to the predetermined, static authorizations defined in advance by the system administrator.

The effect, however, is basically the same. Thus, if the same request is received subsequently, an authorization that is determinative for the request—the dynamic authorization—is now present in the policy data structure. This will then be used to decide the request, avoiding re-evaluation of the dynamic access requirement. This may avoid not only the time penalty associated with reacquiring any necessary attributes, but also the overhead associated with the slower condition-evaluation process. By dynamically converting the results of attribute-based decisions into authorizations in this way, embodiments of the invention may promote the more efficient evaluation process offered by static policy data structures, and thus reducing use of the far more costly dynamic attribute evaluation. This may offer significant improvements in efficiency of the request evaluation process, providing access control systems with improved overall performance.

The access control policy data structure may in general have one or more component data structures. Authorizations can be defined, in general, in any convenient manner so as to indicate that at least one user is (or on the contrary is not) authorized to access at least one resource to at least some extent. Authorizations may be defined both explicitly and implicitly in the policy data structure and may be subject to constraints as discussed above.

In general, dynamic access requirements may be defined in the policy in any convenient manner so as to express what needs to be evaluated to decide on a request for which there is no determinative authorization in the policy. A dynamic access requirement may indicate a condition to be satisfied for the request to be granted in either explicit or implicit terms. For instance, a dynamic access requirement explicitly defining a condition to be satisfied for refusing a request also implicitly defines a condition for granting the request. The condition associated with a dynamic access requirement may in general include one or more component conditions expressed in any convenient manner, such as via Boolean logic expressions.

The set of attributes to be evaluated for a given dynamic access requirement may in general include one or more attributes. These attributes may be associated in a variety of ways with a user request, relating for example to the user, resource, action or environment as mentioned above. Attributes relating to the user may concern any item of information attributed to a user, relating, for example, to some property, quality, characteristic, feature or other item belonging to, describing or otherwise associated with the user. In a typical scenario, user attributes are represented by (e.g., cryptographically encoded in) some form of credential, issued to the user by a trusted entity, which can be presented by the user to prove possession of particular attributes. The set of attributes associated with a request may include attributes provided by the user and also attributes obtainable from other sources such as certification authorities, identity providers (IDPs), credential issuers, time servers, and so on. Where the required attributes are not supplied with the initial user access request, the access control process may include the step of obtaining the required attribute(s) from the appropriate attribute provider(s).

The process for determining whether the policy data structure contains an authorization (or dynamic access requirement) that is determinative for a request can depend upon the manner in which the policy data structure is constructed and how the resulting structure is interpreted by the analysis logic. As a simple illustration, if an authorization in the policy data structure is designed to express all access rights for a given user, then absence of an access right indicates authorization is denied. Such an authorization would then be determinative for any request from that user. However, if the access rights in the same authorization are not deemed exhaustive, then the authorization will be deemed determinative only for user requests concerning access rights expressed in the authorization. Some systems may be designed to provide an applicable dynamic access requirement in all cases where there is no authorization in the policy that is determinative for a user request. In other cases, user requests might simply be refused if no determinative authorization or dynamic access requirement is identified.

When a dynamic authorization is added to the policy data structure, this relates to authorization of the user to access the requested resource but may also express additional information, and in particular any limitation or constraints to which the authorization is subject as derived from the condition evaluated in the dynamic access requirement. Thus, a dynamic authorization may indicate that the user is (or is not) authorized to at least some extent, as determined by application of the dynamic access requirement. Upon adding a dynamic authorization, the policy data structure is supplemented by defining this additional user authorization. Such dynamic authorizations are added for at least some user requests that are decided by application of dynamic access requirements. Dynamic authorizations could, for example, be created only for particular types of request (e.g., concerning particular categories of resources or users), or where the dynamic access requirement involves evaluation of particular attributes or types of attribute. For instance, creation of a dynamic authorization may be dependent on attribute lifetime.

In some systems, dynamic authorizations might be created only when a user request is granted—that is, not if a request is refused. In other systems, dynamic authorizations could be created if deemed appropriate even when a request is refused. For example, if evaluation of the dynamic access requirement indicates that access might be granted in some circumstances, such as at certain times of day, then a dynamic authorization might be created even though the current request is refused, such as due to the time of making the request. As another example, a dynamic authorization could express a negative authorization indicating that the user is not authorized to access the resource in accordance with evaluation of the dynamic access requirement. In some embodiments, a dynamic authorization is added to the policy data structure for at least some user requests at least if it is decided to grant the request by evaluation of a dynamic access requirement.

Where attributes used in evaluating dynamic access requirements have a limited lifetime, then this can be identified in preferred embodiments and accounted for in the process of creating dynamic authorizations. User attributes certified by some form of credential, in particular, are typically subject to a temporal validity limitation corresponding to the validity period of the credential. Credential issuing authorities typically certify attributes as valid for a limited period and indicate the appropriate expiration time in the credential itself. In some embodiments of the invention, upon applying a dynamic access requirement to a request, any temporal validity limitation indicated for the set of attributes evaluated for that requirement is identified. For example, the earliest expiration time associated with attributes in the set may be identified.

This time limit may be used in deciding whether to create a dynamic authorization as discussed further below. In addition, while applications involving only attributes with no validity limits might be envisaged, some embodiments can allow dynamic authorizations to be created and managed even where these authorizations are based on attributes with limited lifetimes. In particular, an expiration time for a dynamic authorization can be defined in the policy data structure and the authorization only applied to a subsequent user request up to that expiration time. This could be implemented in various ways, such as by monitoring expiration times and removing dynamic authorizations when expiration times are reached.

The block diagram of FIG. 1 is a simplified schematic of an exemplary data processing system 1 showing the main elements involved in the access control process to be described, according to an embodiment of the invention. In this system, a policy enforcement point (PEP) 2, such as a server such as a file server or web server, controls access to resources 3, such as files or web pages, by users which are represented simply in the figure by user computers 4. In response to a user request for access to a resource 3, the PEP 2 communicates with access control apparatus, indicated generally at 5, via a request handler 6 of the system.

Access control apparatus 5 includes an authorization server 7 that makes access control decisions in accordance with an access control policy data structure stored in a policy database 8. Authorization server 7 includes control logic in the form of controller 9 and local memory 10. Controller 9 incorporates the decision engines for applying policy to access requests to decide whether requests should be granted or refused. In addition to this access decision process, controller 9 includes functionality for creation and management of dynamic authorizations as described in detail below. In general, the control logic of controller 9 may be implemented in hardware or software or a combination thereof In the present example, the logic is implemented by software running on authorization server 7, and suitable software will be apparent to those skilled in the art from the description of operation herein.

In this example, the access control policy is defined and interpreted in access control apparatus 5 with features relating to dynamic access requirements as described in detail below. The access control policy in database 8 is represented by a composite data structure which uses access control lists (ACLs) and protected object policies (POPs) associated with "protected objects" ("objects" for short) that are logical representations of resources. An object data structure is defined in which objects are associated with individual "access control nodes" in a hierarchical arrangement of access control nodes. Access control nodes are defined by a parameter tuple (ACL, POP, rule) that indicates access rights for a resource. In particular, authorizations are defined by attaching an ACL and/or POP to an access control node corresponding to an object in the hierarchical structure.

The ACL is an access control list that contains user name(s) with flags to indicate authorized actions. Thus, an ACL indicates that user X (the "subject") is authorized to do action(s) Y to the resource (object) in question (where user X here may be a single user or a group of users). The authorization can be subject to one or more constraints that can be expressed in the associated POP. A typical example is a time-of-day constraint whereby an authorization expressed in the ACL is effective only at certain times indicated in the POP. Authorizations can be defined explicitly and implicitly in the hierarchical data structure. In particular, any node not having an (explicit) ACL implicitly inherits the ACL associated with its closest parent, whereby an ACL is defined implicitly for the resource(s) associated with that node.

The parameter "rule" is used to define a dynamic access requirement for a node. In particular, this parameter can be used to define a Boolean rule expressing a condition to be satisfied by a set of one or more specified attributes associated with a user request for the request to be granted on a dynamic basis. This is the case even though no authorization determinative for the request is associated with the node in question (i.e., when evaluation of the ACL (plus POP) alone is not sufficient to produce a grant/refuse decision).

Through appropriate use of the ACL, POP and rule parameters described, the system administrator can construct a policy data structure defining both predetermined, static authorizations (which do not require evaluation of dynamic attributes) for system users, as well as rules expressing dynamic access requirements which allow evaluation of user requests based on dynamic attributes associated with those requests. This static policy data structure is stored in policy database 8 and can be updated from time to time by the system administrator. In the present system, however, authorization server 7 can also insert dynamic authorizations in the policy data structure. Before the creation and management of these dynamic authorizations are described, however, the basic access control operation of system 1 is now described.

A user 4 wishing to access a resource 3 submits a request to the PEP 2 of the system. The PEP reformulates the request as necessary in terms of the appropriate subject, resource and action elements defined in the system, and then forwards the user request to request handler 6. Request handler 6 relays the user request to authorization server 7.

Figure 2:
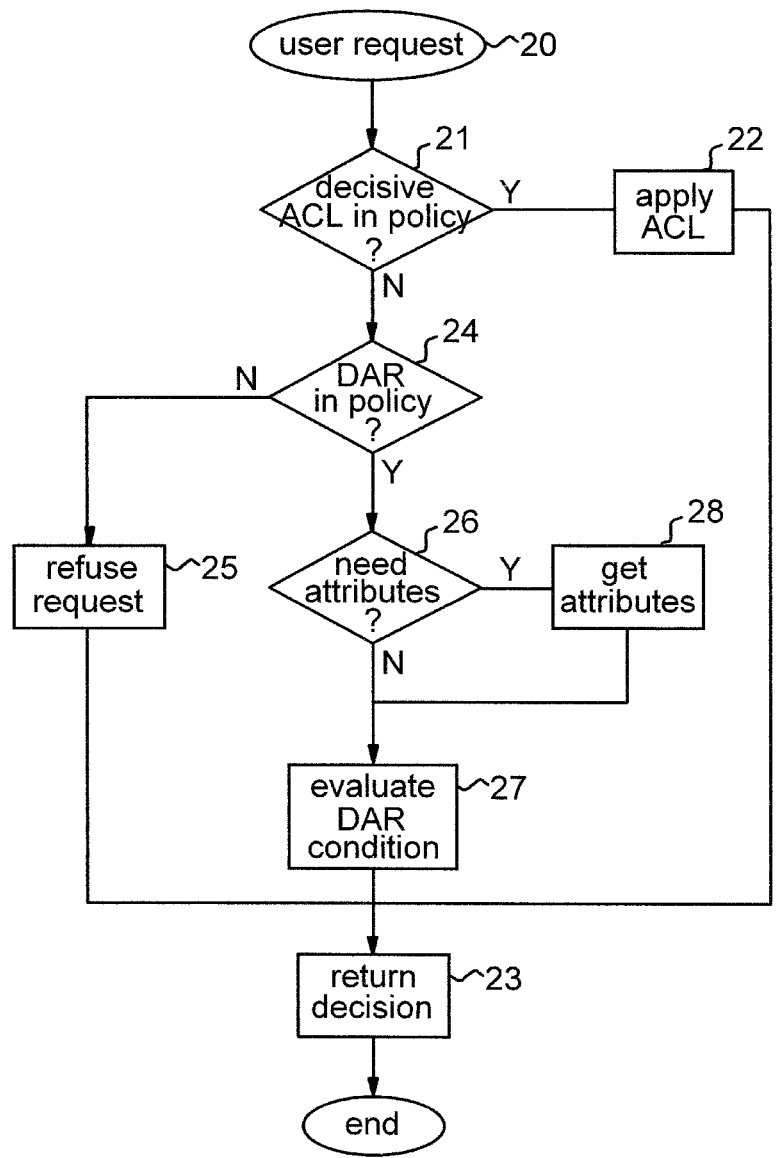
FIG. 2 is a flowchart of a method showing basic operation of the access control apparatus in the FIG. 1 system in response to a user access request, according to an embodiment of the invention.

FIG. 2 indicates basic steps of the decision-making process performed by authorization server 7 in response to the user request, according to an embodiment of the invention. Receipt of the request is represented by step 20 in the figure. Controller 9 stores the request in local memory 10 and then accesses the policy data structure in database 8 to determine whether the policy contains an ACL (and any associated POP) that defines an authorization that is determinative for the request. If such a determinative ACL ("decisive ACL" in the figure) is found, as indicated by a "Yes" (Y) at decision step 21, then in step 22 controller 9 applies the ACL (with any applicable POP conditions associated with the ACL) to decide whether to grant or refuse the request. In step 23, controller 9 then returns the resulting decision to PEP 2 via request handler 6, and the decision process terminates. PEP 2 permits or denies user access to the requested resource 3 in accordance with the decision.

Returning to step 21, if the policy contains no authorization that is determinative for the user request (i.e., the ACL (plus POP) of the access control node is not decisive), operation proceeds to step 24. The controller 9 checks for a determinative dynamic access requirement (DAR) in the policy structure. In particular, the controller checks whether the "rule" parameter of the node can be applied to obtain a decision based on dynamic attributes. In general, if no dynamic access requirement is found ("No" (N) at step 24), the decision can be made in step 25 to refuse the request and this decision will be returned to the PEP 2 at step 23. Assuming, however, that an appropriate dynamic access rule is identified at step 24, then in step 26 controller 9 decides if any attributes need to be obtained for evaluation of the rule, i.e. if all necessary attributes have not been supplied with the request. In general, however, if no further attributes are needed (N at decision 26), then operation can proceed to step 27.

Assuming, however, that the rule does involve attributes not supplied with the user request (Y at step 26), operation proceeds to step 28. The controller 9 informs request handler 6 which attributes are outstanding. Request handler 6 contacts the appropriate attribute sources to obtain the attributes in question and returns these to authorization server 7. Attributes may be obtained here from a variety of sources, including the user, certification entities, credential issuers, identity providers or other trusted information verifiers, system components, time servers, and so on. Having obtained all necessary attributes at step 28 and stored the attributes in memory 10 for the user request, in step 27 controller 9 decides whether to grant the request by determining whether the attribute(s) satisfy the access condition expressed in the rule. The resulting decision is then returned to the PEP in step 23 and the decision operation is complete.

In addition to the basic decision process just described, controller 9 is operable to generate dynamic authorizations in certain circumstances and to manage the addition and removal of these dynamic authorizations in the policy data structure defining the static authorization ACLs. In this simple example, controller 9 creates dynamic authorizations when it is decided to grant certain user requests following application of a dynamic access rule (steps 27 and 23 of FIG. 2). The main steps of this process according to one embodiment of the invention are indicated in the flow chart of FIG. 3.

Figure 3:
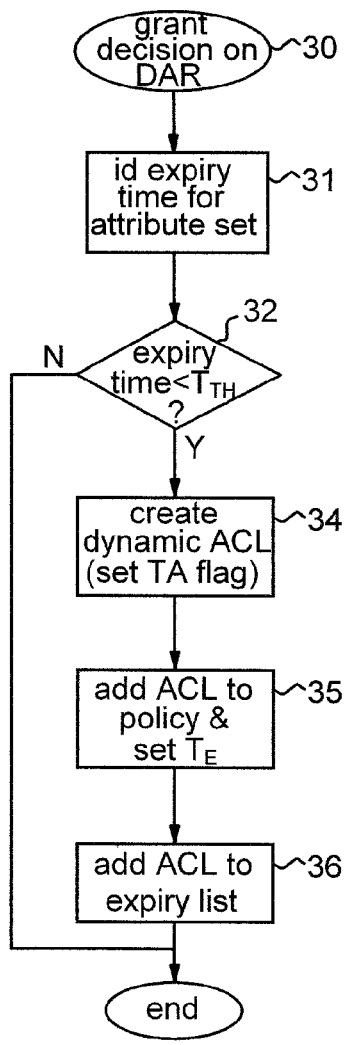
FIG. 3 is a flowchart of a method for creating dynamic authorizations in an access control apparatus of a system, according to an embodiment of the invention.

Upon deciding to grant a request following application of a dynamic access rule, as represented by step 30 in FIG. 3, operation proceeds to step 31. The controller 9 determines an expiration time for the attribute set stored in memory 10 that was evaluated in application of the dynamic access rule. In particular, any temporal validity limitation indicated for these attributes (e.g., as indicated in a credential attesting to an attribute or otherwise associated with the attribute in some way) is identified by the controller and an appropriate expiration time for the attribute set is defined accordingly. For example, the earliest expiration time associated with an attribute in the set may be taken as the expiration time for that set. (If no attributes are subject to a time limitation, then the expiration time can be effectively deemed infinite.)

Next, in step 32 controller 9 compares the expiration time with a threshold time $T_{TH}$. This threshold can be defined in controller 9 as expiration of a preset time interval from the current time. An appropriate time interval could be preset for all user requests or for different categories of user requests, or could be calculated by the controller using a predetermined algorithm. Such an algorithm might account, for example, for the expected frequency of receipt of the user request. In any case, if the expiration time does not exceed the threshold $T_{TH}$, (N at decision step 32), then no action is required and the process terminates. If however, the expiration time exceeds $T_{TH}$ (Y at step 32), then operation proceeds to step 34. The controller 9 creates a dynamic ACL defining authorization of the user to access the resource according to the user access request.

The extent of the user authorization (e.g., permitted action(s) and any associated constraints such as time-of-day limitations, etc.) as derivable from the rule condition can be expressed in the dynamic ACL and an associated POP. The ACL is marked as a dynamic ACL by setting "temporary authorization" (TA) flag designated for this purpose in the ACL data. (ACLs typically have multiple such flags which can be assigned to various purposes, and the temporary flag here can simply be an unused flag in this basic flag-set.) In step 35, controller 9 inserts the dynamic ACL in the policy data structure in database 8 by attaching the ACL to the appropriate access control node in the structure. Any applicable authorization constraints are defined in an associated POP as mentioned above. In addition, the expiration time identified in step 31 is also entered in the policy data structure as a time constraint, indicating the expiration time $T_E$ of the dynamic ACL, by recording the time $T_E$ as metadata in a suitable metastructure of the policy.

The addition of a dynamic ACL in step 35 can be achieved by employing various techniques. For example, a dynamic ACL might be added as an additional ACL for an access control node, i.e. in addition to the usual static ACL for the node. In this case the policy analysis logic could be adapted to give precedence to a dynamic ACL over a static ACL if both apply to a user request (up to the expiration time $T_E$). Alternatively, a static ACL could effectively be replaced by a dynamic ACL that defines both the new, dynamic authorization and the authorizations expressed in the old, static ACL. In this case, metadata that distinguishes the static authorization data from the dynamic authorization data in some convenient manner will be recorded in the policy data structure for the purposes described later.

In a final step, step 36, of the dynamic authorization procedure, the controller 9 enters an identifier for the dynamic ACL, together with the expiration time $T_E$ for the ACL, in an expiration list maintained as part of the policy data in database 8. This identifier allows the controller to locate the dynamic ACL conveniently when required subsequently as discussed below. This step completes the dynamic authorization process.

The effect of the FIG. 3 process is that dynamic ACLs expressing dynamic authorizations will be added to the static policy data in database 8 whenever a user access request is granted by dynamic rule evaluation and the attribute set used to evaluate that rule is deemed sufficiently long-lived—i.e., the rule effect is deemed valid for a time $>T_{TH}$. If the same request is received again within the expiration time of the dynamic ACL, this ACL will be identified as determinative for that request in step 21 of the FIG. 2 process. In particular, the process performed by controller 9 in step 21 of FIG. 2 in one embodiment of the invention is illustrated in more detail in FIG. 4.

Figure 4:
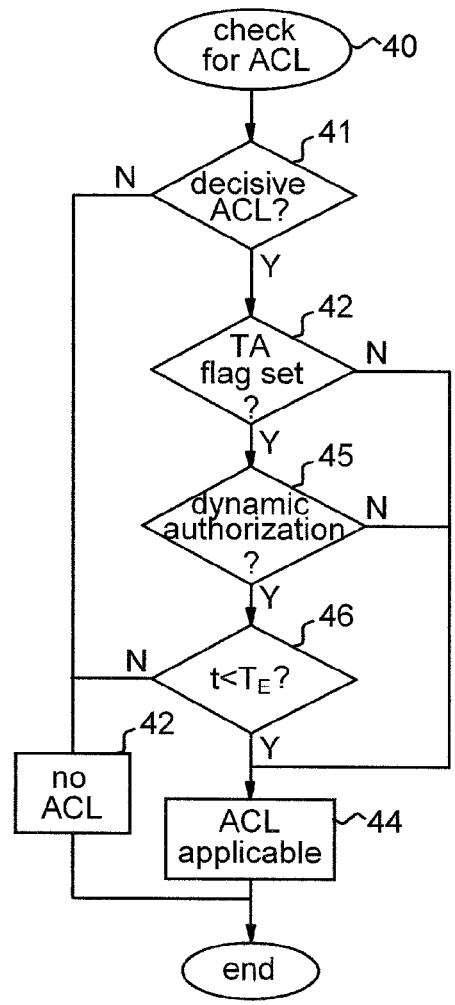
FIG. 4 is a flowchart of a method for identifying determinative authorizations in a policy data structure, according to an embodiment of the invention.

The process of checking the policy for a determinative ACL is initiated at step 40 in FIG. 4. In step 41, controller 9 determines if the policy structure contains an ACL matching the subject, action, resource tuple in the request and determinative of the access decision for that request. No distinction is made between static and dynamic ACLs in this step. Typically systems are constructed such that a matching ACL (though not necessarily determinative) will be available for all requests. If no determinative ACL is found at step 41, then controller 9 determines at step 42 that there is no applicable ACL and the FIG. 4 policy analysis terminates (i.e., operation then proceeding to step 24 in FIG. 2).

Assuming, however, a determinative ACL for the request is found (Y at decision step 41), then in decision step 42 controller 9 checks whether the temporary authorization flag is set for the ACL. If not—i.e. if the ACL is a static ACL—then controller 9 proceeds to step 44 where the ACL is deemed applicable for the request and the FIG. 4 process terminates. However, if the temporary flag is set for the ACL (Y at decision step 43), then the ACL is a dynamic ACL. In implementations where a dynamic ACL includes both dynamic authorizations and static authorizations as described above, then in step 45 the controller checks the associated metadata to determine if the relevant authorization for the current request is a dynamic authorization. If not, then operation proceeds to step 44. If so, however, in step 46 the controller then checks the current time t against the expiration time $T_E$ of the dynamic ACL in the associated metadata. If $t<T_E$, the dynamic ACL is still valid whereby operation proceeds to step 44 and the ACL is deemed applicable. If t is equal to or greater than $T_E$ in decision 46, then controller 9 determines at step 42 that there is no applicable ACL. The search for a determinative ACL is then complete.

The effect of FIG. 4 is that dynamic authorizations in dynamic ACLs are identified as determinative for any matching requests received within their expiration time. The original dynamic access rule evaluation is therefore disabled for relevant requests during the lifetime of a dynamic ACL. In this way, the inefficient process of dynamic rule evaluation is bypassed in favor of a more highly efficient ACL evaluation process. Note that a dynamic authorization may apply not only to exactly the same request as that prompting its creation, but also to any other request with a subject, action, and resource tuple within the authorization definition derived from the rule condition and expressed in the dynamic ACL. Thus, dynamic authorizations can be applicable to whole classes of requests where the rule evaluation indicates this to be appropriate. Only the first of these access requests will incur the cost of running the rules evaluation engine in controller 9. All subsequent requests within the validity time $T_E$ of the dynamic ACL incur only the much lower cost of a normal ACL evaluation. Moreover, since dynamic ACLs are integrated in the static authorization structure in this preferred embodiment, the policy evaluation path is especially efficient.

The improvement in performance through use of the dynamic authorization system described can be understood by considering the relative efficiency of evaluating ACLs and dynamic access rules. In a current web server based system, handling an HTTP request from a user using the rules engine for request evaluation is considered twice as expensive as a normal ACL-evaluated request. Throughput, in terms of web pages delivered per second, is roughly halved for trivial rules-engine rules without the need to retrieve dynamic attributes. For more complex rules the impact is even greater, and for rules requiring RTTs to retrieve attributes even more so. Note that throughput is the most important efficiency criterion in some types of systems.

Moreover, the cost and throughput implications consider the handling of an entire web transaction, from interception and parsing of an HTTP request, through making the access control decision to forwarding the HTTP message to the respective HTTP server. Of this entire process, the use of the rules engine accounts for only for a small percentage. Accounting for this fact, the actual cost of involving the rules engine in a request evaluation can be estimated as approximately six times the processing time for an ACL-based access control decision for even the simplest requests. For complex requests, or where RTTs are involved for attribute retrieval, the comparison is even worse. This demonstrates that the use of dynamic authorizations is an extremely powerful mechanism for improving performance in access control systems.

The system described not only permits dynamic ACLs to be computed and integrated into the static authorization data structure, but also provides an efficient and secure mechanism for removing the dynamic authorizations. In particular, the expiration list maintained in policy database 8 can be used to identify dynamic ACLs whose expiration time $T_E$ has been reached. This list can be ordered by expiration time so that that the next-to-expire dynamic ACL comes first. However, the use of temporary authorization flags and checking of expiration times in the process described above ensures that dynamic authorizations that have expired cannot be applied to requests.

Hence, the process of removing expired authorizations from the policy structure can be conducted when most convenient. For example, a "lazy evaluation" process could be employed whereby dynamic authorizations are removed "on-the-fly" by controller 9 when an expired ACL is identified in step 46 of FIG. 4. Alternatively, for example, a "garbage collection" process could be performed whereby controller 9 removes expired dynamic ACLs in times of low load. Note that, in embodiments where dynamic ACLs include both static and dynamic authorizations as described earlier, then the original static ACL, containing the static authorizations, can be restored to the policy when the dynamic ACL is removed based on the metadata discussed above. Overall, the overhead for the creation and subsequent clean up of a dynamic ACL will be amortized if the dynamic authorization is used even once within its validity time. For long-term attributes, such as those with a lifetime of more than a day, the effect of the improvement in efficiency will be profound.

Changes and modifications can be made to the system that has been described. As one example, while dynamic authorizations can be generated in the above system in response to granting an access request via rule evaluation, developments can be readily envisaged. Dynamic authorizations may, for instance, be generated if an access request is refused, such as if the rule evaluation process indicates that access might be given in certain circumstances. Such circumstances could be encoded in constraints expressed in a POP. A particular example here is where a request is refused due to a time-of-day condition expressed in a rule, whereby access would be granted if the same request were received at an acceptable time.

Dynamic authorizations might also indicate that a user is not authorized in accordance with the rule evaluation. Circumstances can be envisaged where controller 9 can add a dynamic authorization by modifying an existing dynamic ACL. Also, while dynamic ACLs are integrated in the static policy structure in the above embodiment, alternatives can be envisaged in which dynamic authorizations are defined independently in the policy data structure. Note also that, while caching of attributes is not required for operation of the dynamic authorization system described, the attribute sets could be retained in memory 10 as a cache memory if desired. Such cached attributes might provide useful information for later operations of the controller, such as for modifying existing dynamic ACLs.

Embodiments of the invention may be based on access control systems other than those described herein, and mechanisms other than ACLs might be employed to define authorizations in such systems. Also, system components indicated as single entities in FIG. 1 may be implemented by more than one entity where appropriate. Similarly, functionality of different components in FIG. 1 may be combined in some embodiments. In general, a data processing system embodying the invention might be any system of one or more devices, which may be interconnected via (one or more) data communications networks, in which resources are available for access by requesting users.

It is therefore noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wired, optical fiber cable, RF, and so on, or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

What is claimed is:

1. A method comprising:
   determining, by a processor, whether a policy data structure defines an authorization for a request to access a resource, the policy data structure defining a plurality of predetermined authorizations, each predetermined authorization relating to authorization of at least one user to access at least one resource, each predetermined authorization further relating to a plurality of dynamic access requests, each dynamic access request indicating a condition to be satisfied by a respective set of attributes associated with a user request to access a resource and for the request to be granted in absence of an authorization determinative of the request;
   in response to determining that the policy data structure defines an authorization for the request to access the resource, applying the authorization, by the processor, to determine whether to grant the request;
   in response to determining that the policy data structure does not define an authorization for the request to access the resource,
      determining, by the processor, whether the policy data structure defines a dynamic access requirement determinative for the request;
   in response to determining that the policy data structure defines a dynamic access requirement determinative for the request,
      determining, by the processor, whether to grant the request in accordance with the respective set of attributes associated with the request;
      for at least one user request, after determining whether to grant the request, adding a dynamic authorization relating to authorization to access the resource within the request, by the processor, to the policy data structure.

2. The method of claim 1, further comprising, for at least one user request, adding the dynamic authorization to the policy data structure where the request has been granted.

3. The method of claim 1, further comprising:
   identifying any temporal validity limitation for the set of attributes associated with the request to which the dynamic access requirement is applied; and,
   determining whether to add the dynamic authorization to the policy data structure in accordance with the temporal validity limitation.

4. The method of claim 1, further comprising, where the dynamic authorization has been added to the policy data structure:
   defining an expiration time for the dynamic authorization within the policy data structure in accordance with a temporal validity limitation indicated for the respective set of attributes associated with the request; and,
   only applying the dynamic authorization to a subsequent request up to the expiration time.

5. The method of claim 4, further comprising:
   upon adding the dynamic authorization to the policy data structure, setting a temporary authorization flag associated with the dynamic authorization in the policy data structure; and,
   before applying an authorization to a further request,
      determining whether the temporary authorization flag is set for the authorization;

in response to determining that the temporary authorization flag is set for the authorization, checking the expiration time for the authorization.

6. The method of claim 4, further comprising:
removing the dynamic authorization from the policy data structure upon the expiration time having been reached.

7. The method of claim 1, wherein the policy data comprises a static authorization data structure defining the predetermined authorizations,
and wherein the dynamic authorization added to the policy data structure is integrated within the static authorization data structure.

8. The method of claim 7, further comprising:
maintaining in the policy data structure a list identifying the dynamic authorization in the policy data structure and indicating an expiration time associated with the dynamic authorization.

9. The method of claim 1, wherein the predetermined authorizations are defined by access control lists (ACLs) within the policy data structure,
wherein the dynamic authorization is defined by at least one ACL within the policy data structure,
and wherein adding the dynamic authorization to the policy data structure comprises adding an ACL defining the dynamic authorization to the policy data structure.

10. The method of claim 1, further comprising, upon applying the dynamic access requirement to the request, storing at least some of the respective set of attributes associated within the request in a memory.

* * * * *